Patented May 8, 1928.

1,669,326

UNITED STATES PATENT OFFICE.

ADOLPHE CHALAS AND ELLEN CHALAS, OF NEUILLY-SUR-SEINE, FRANCE.

SOLUBLE-FOOD PRODUCT HAVING FRESH KOLA AS A BASE AND PROCESS FOR PREPARATION OF THE SAME.

No Drawing. Application filed April 24, 1925, Serial No. 25,666, and in France May 7, 1924.

Our invention relates to the manufacture of a dry food product having fresh kola as a base, said product being immediately soluble in aqueous beverages, and chiefly in breakfast drinks or the like, such as coffee, tea and like infusions with or without milk, meat and vegetable broth, consommé, soups, cocoa and chocolate, and in wines and like hydro-alcoholic drinks, without altering their taste or appearance.

It is a known fact that the extract obtained from kola nuts which are dried spontaneously in air and without preliminary destruction of the oxidases, is for the major part insoluble in water, due to the oxidation of the active catechic principles and other tannoid substances of the nut, and their conversion into phlobaphenic anhydrides (kola red) which are entirely insoluble, with decomposition of the complex active substance of fresh kola (kola-caffein, etc.) and with disengagement of caffein, tannins and phlobaphenes. It is also observed that the breakfast beverages, consumed in the hot or the cold state, greatly excite the gastric juice, and their comforting effect is largely due to this source.

In order to combine this action with the effects of fresh kola, our process consists essentially in incorporating a suitable amount of lactose into the extract of fresh-kola, so as to obtain a dry compound in the form of powder, or in the granulated or compressed state, which may be indefinitely preserved in a simple paper covering, for example, and can at once be dissolved in an aqueous drink in whatever state, either sweetened or salted, or containing any other suitable aliment or condiment. In the amount which we employ, the lactose, will impart no particular taste to the beverage.

The extractive form of kola which we prefer to employ for this manufacture is the soft hydro-alcoholic extract which is usually obtained by treating the fresh nuts, after the destruction of the oxidases by heat or by like physical or chemical means.

The said extract is peptizable by boiling water, and will thus afford a colloidal solution containing all the principles of the fresh kola. To this solution which is maintained in the heated state on the water bath, we add powdered lactose which at first produces a thick sirup and then a mass which has a pasty consistence in the first place and then becomes less and less humid as more lactose powder is added.

During this operation, the product is constantly stirred and mixed in such manner that the grains of lactose will be entirely coated with the sirupy portion containing the kola extract in solution. The mixing is continued during the evaporation, which takes place rapidly until the compound contains but a few per cent of its weight of moisture. It is then treated in the grinding machine in order that the pieces which have become more or less agglomerated may be disaggregated, and this will furnish a homogeneous powder of a pinkish hue, which may be directly placed in paper bags, or may be more completely dried and suitably wrapped. To obtain granulated products, the operation is on the contrary performed upon the mass while still in the moist state, and for compressed tablets or the like, the operation is performed upon the powder or upon the granulated products.

To give a concrete idea of the said process, the following quantities may be employed by way of example.

The fresh kola nut, which is dried after the destruction of the oxidases, will afford about one-half its weight of dry substance, and this will produce about one-tenth of its weight of soft extract. The food ration in Africa corresponds as a rule to $\frac{1}{5}$ of a fresh kola nut of average weight or about 12 grams, and this will correspond to some 10 centigrams of soft extract.

Should it be desired to prepare rations representing 2 grams of the powder containing lactose, for instance, it will be necessary to employ for 10,000 rations, 1.5 kgs. of kola extract and 17.5 kgs. of lactose, if the resulting powder contains 5 per cent of moisture. A quantity of water varying from 50 to 100 per cent of the weight of the extract will be sufficient to peptize the latter and to provide for the proper coating by means of the amount of lactose in use, and this will apply to the manufacture of the powder and also of the granulated substance and compressed tablets.

Having thus described our process what we claim as new therein, and our own invention, is:

1. A process for the manufacture of a food product having fresh kola as a base, consisting in destroying the oxidases of the fresh kola, in preparing a soft extract of the said fresh kola which is thus free of oxidases, in diluting this extract in hot water, in gradually adding lactose to the said mixture while continuously stirring until the mixture is in the state of almost dry grains, and in crushing the product thus obtained.

2. A process for the manufacture of a dry food product having fresh kola as a base and immediately soluble in breakfast drinks, which consists in peptizing the extract of fresh kola nuts, after the destruction of the oxidases, by means of boiling water, in maintaining the resulting colloidal solution containing the active principles of the fresh kola in the heated state in the water bath, in adding thereto powdered lactose which forms in the first place a thick sirup and then a mass which is at first pasty but becomes less and less humid according to the successive additions of the powdered lactose.

3. A process for the manufacture of a dry food product having fresh kola as a base and immediately soluble in breakfast drinks, which consists in peptizing the extract of the fresh kola nuts by means of boiling water, in maintaining the resulting colloidal solution in the heated state on the water bath, in adding thereto powdered lactose, in constantly stirring and mixing the product during the addition of the lactose, in subsequently evaporating the same and in continuing the mixing during this evaporation, until the resulting product contains only a few per cent of its weight of moisture.

4. A food product consisting of a mixture of kola and lactose, the kola being in the state of an extract of fresh kola and being free of oxidase, and this mixture being substantially dry.

In testimony whereof we have hereunto affixed our signatures.

ADOLPHE CHALAS.
ELLEN CHALAS BORN BUTLER.